Patented Aug. 7, 1951

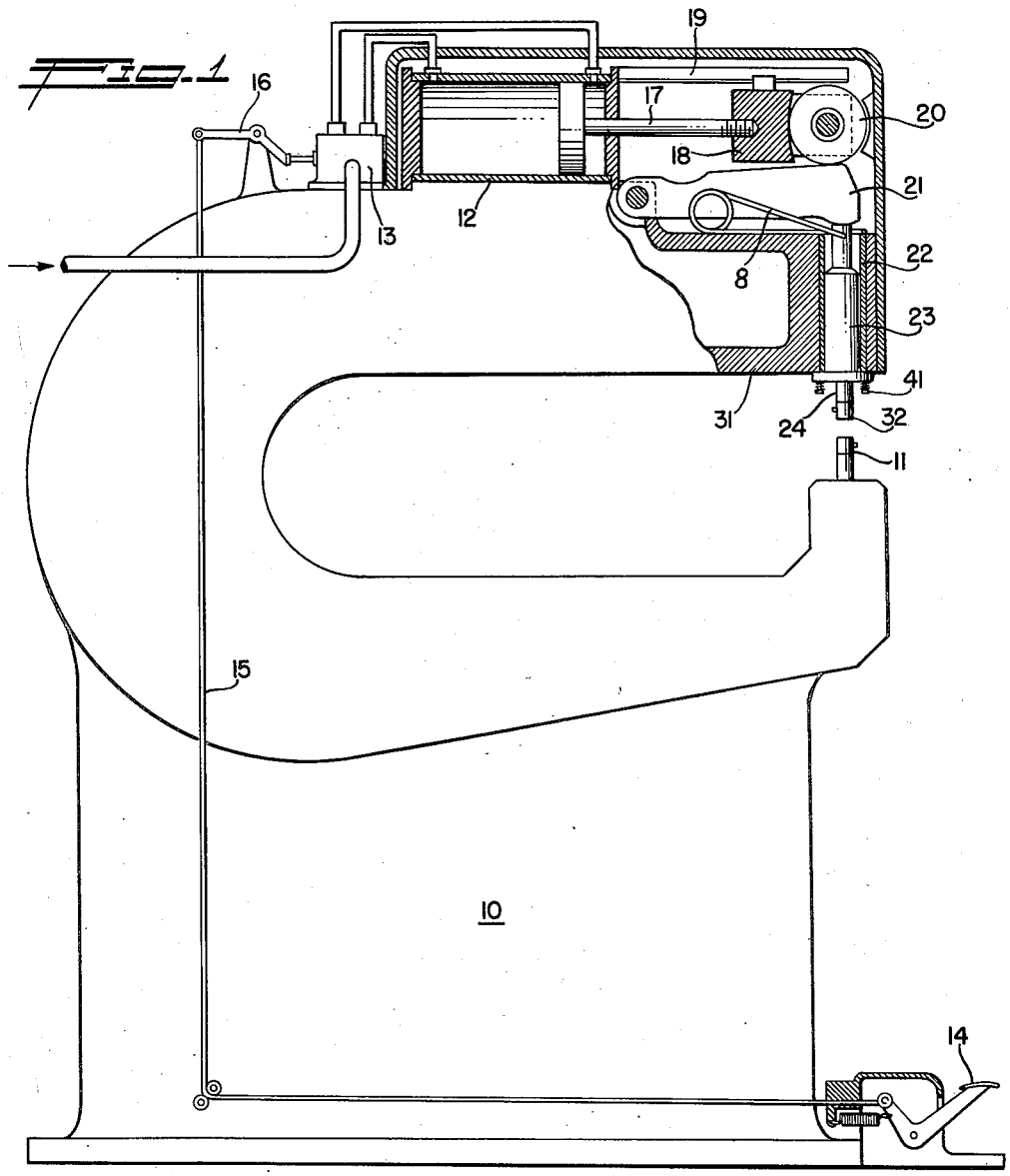
INVENTORS
DeLoy J. White
James Wilson Smith
BY
George C. Sullivan
Agent

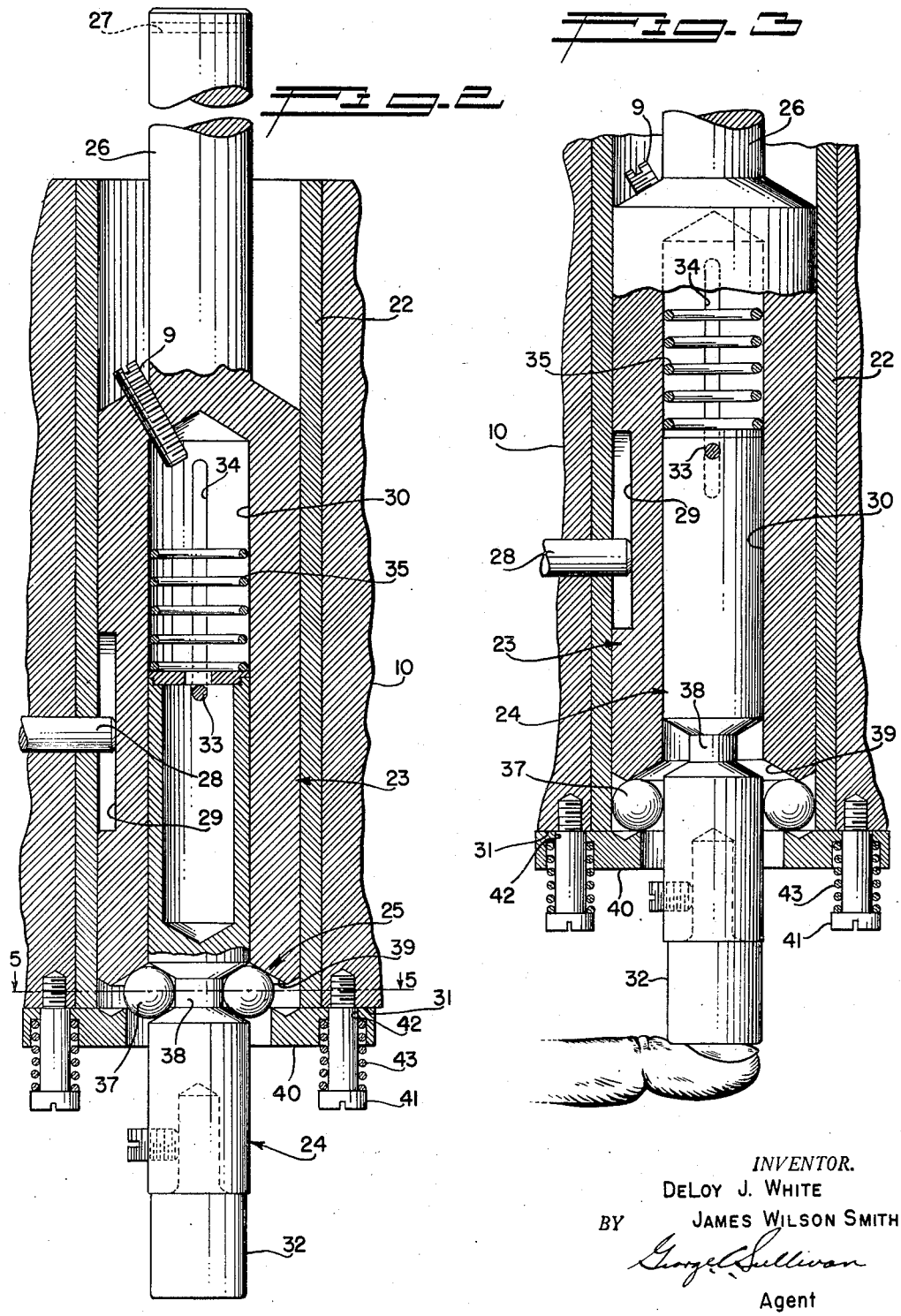
INVENTOR.
DELOY J. WHITE
JAMES WILSON SMITH
BY
George C Sullivan
Agent

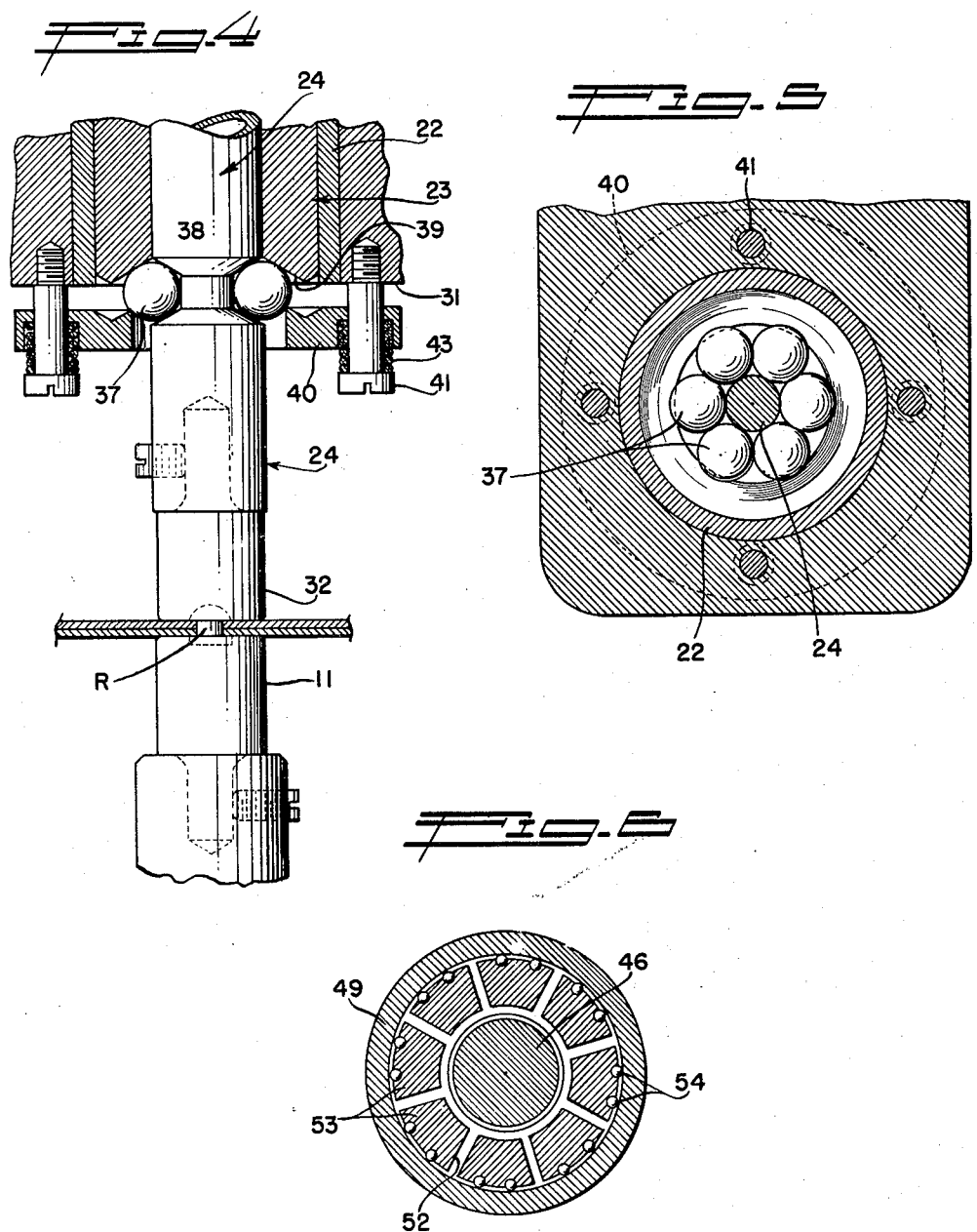

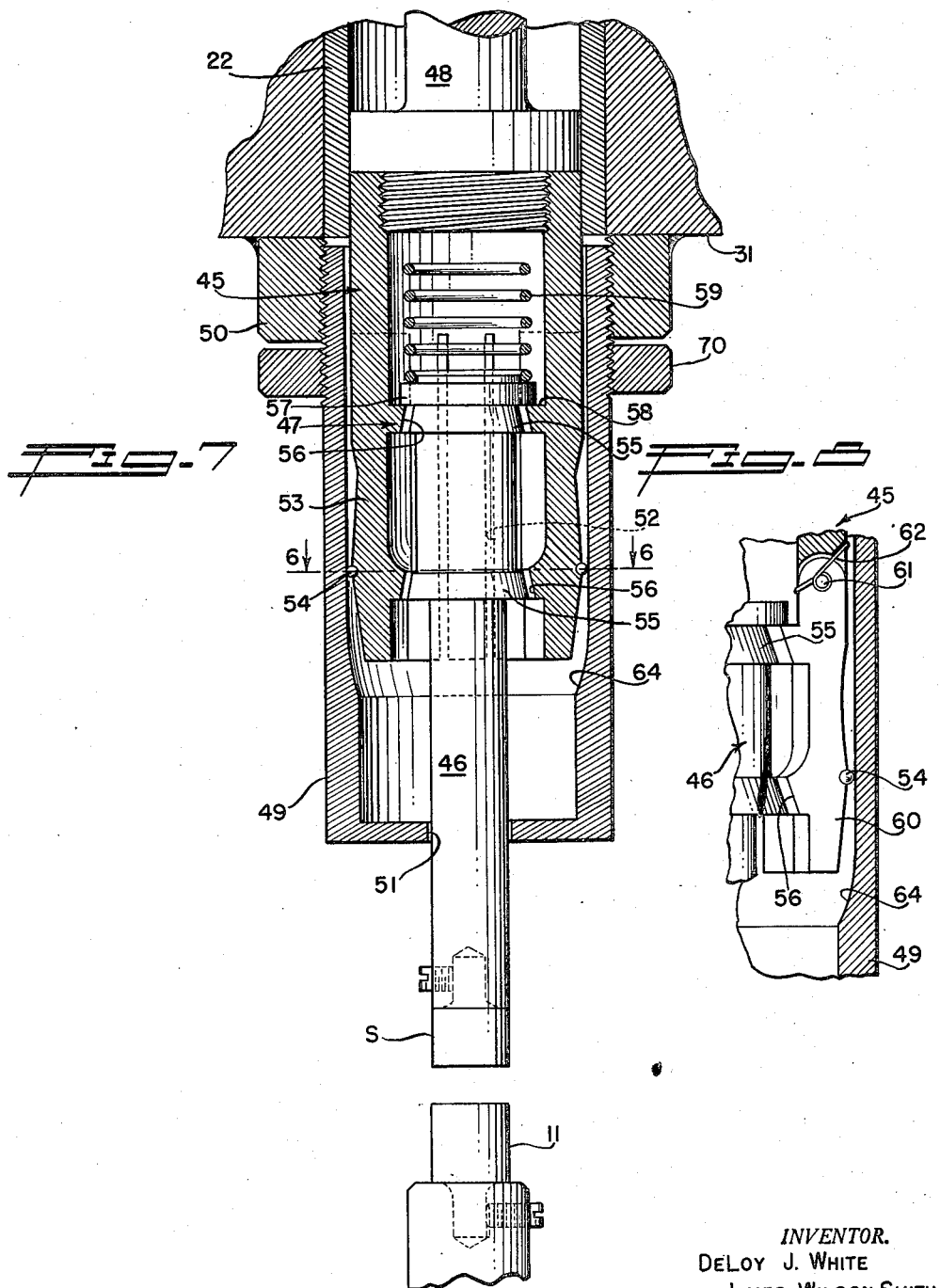

2,563,296

UNITED STATES PATENT OFFICE 2,563,296

SAFETY DEVICE

De Loy J. White, North Hollywood, and James W. Smith, Burbank, Calif., assignors to Lockheed Aircraft Corporation, Burbank, Calif.

Application July 27, 1946, Serial No. 686,660

3 Claims. (Cl. 192—134)

This invention relates to power operated tools, and relates more particularly to safety devices for use with riveters, squeezers, punches, presses, and other power actuated tools of this class. A general object of this invention is to provide a practical, inexpensive and dependable safety means for such tools and machines.

Many power actuated tools are provided with foot pedals for initiating their operation, leaving the operator's hands free to manipulate the work and to place it between the active parts of the machine. In the event the pedal is depressed at a time when the operator's hand is between the active machine parts, serious physical injury often results. Safety guards arranged adjacent the active machine parts are sometimes used, but do not obviate the hazard and seriously interfere with the positioning of the work pieces.

It is an object of the present invention to provide a safety means for use on squeezing, pressing, punching and riveting machines which precludes the possibility of injury to the operator in the event the machine is put into operation when his hand or other part of his body is between the active work parts of the machine. The safety device is such that the active force or power of the machine is not applied to the part of the operator's body that is unintentionally or accidentally caught between the squeezing, pressing, punching or riveting elements.

Another object of the invention is to provide a safety device of this character that is thoroughly dependable and does not require the use of electric circuits, fluid pressure devices or other instrumentalities liable to become inoperative.

Another object of the invention is to provide a safety device that does not interfere with the normal operation of the machine or require any change in the manual handling of the work or in the control of the machine.

It is another object of the invention to provide a safety device that is installed directly on one of the active work parts of the machine and that does not necessitate alteration of the primary machine elements.

A further object of the invention is to provide a simple, inexpensive safety device that may be easily installed either as an appliance for a previously assembled machine or as an original machine part.

Other objects and features of the invention will be readily understood from the following detailed description of typical preferred forms of the invention wherein reference will be made to the accompanying drawings in which:

Figure 1 is a side elevation of a riveting or squeezing machine incorporating a safety device of the invention showing the active machine parts in a diagrammatic manner;

Figure 2 is an enlarged vertical sectional view of the safety device in the partially operated position ready to apply the active force to the work piece;

Figure 3 is a view similar to Figure 2 showing the parts in a released condition where the active force cannot be transmitted to an object between the active machine elements;

Figure 4 is a fragmentary vertical sectional view with certain parts appearing in side elevation, showing a rivet being driven;

Figure 5 is a transverse detailed sectional view taken substantially as indicated by line 5—5 on Figure 4;

Figure 6 is a transverse sectional view of another form of the invention, being a view taken as indicated by line 6—6 on Figure 7;

Figure 7 is a vertical sectional view of said other form of the invention with certain parts appearing in side elevation; and, Figure 8 is a fragmentary vertical sectional view of a modification of the device shown in Figure 7.

In Figure 1 we have shown a pneumatically operated riveter or squeezer for driving rivets and have illustrated one form of the invention associated with the machine. It is to be understood that this is merely a typical application and the invention is not primarily concerned with the details of the machine. For this reason, the machine is shown in a more or less diagrammatic manner. The riveting machine comprises a base or frame 10 carrying a stationary anvil 11. The anvil 11 may be capable of vertical adjustment so as to vary the position of the active portion of the work stroke. The upper portion of the base is substantially C-shaped to receive the work pieces, and the upper arm of the C carries a cylinder and piston mechanism 12. A valve 13, the details of which are not required for a full understanding of the invention, controls the delivery and release of actuating fluid pressure to and from the opposite ends of the cylinder mechanism 12. The valve 13 is controlled by a foot pedal 14, the pedal being connected with the valve by a flexible cable 15 and a bell crank 16. The piston rod 17 of the cylinder mechanism 12 carries a block 18 which is supported and guided by a track 19. A cam lever 21 is pivoted in the frame 10 and the block 18 carries a roller 20 for swinging the lever downwardly as the piston rod 17 moves forwardly. The upper arm of the C frame has a vertical bushing 22 for slidably guiding an element of the set or die holder hereinafter termed the body 23 of the safety device. The upper end of this body 23 is engaged by the lever 21 to be forced downwardly upon actuation of the cylinder mechanism 12. Spring means 8 serves to return the lever 21 and body 23 after each actuation.

The safety device illustrated in Figures 1 to 5 inclusive, comprises the body 23, a set or die-carrying member 24 related to the body for relative longitudinal movement, and means 25 for coupling the body and member for the transmission of force therebetween, which means is released or ineffective in the event movement of the member 24 is prematurely resisted. While we have shown the safety means associated with the movable work-engaging part, it is to be understood it is adapted for other installations.

The body 23 is an elongate part slidable in the above described bushing 22. A reduced stem 26 in the upper end of the body is engaged by the cam lever 21 and has an opening 27 for receiving the return spring 8. The vertical movement of the body 23 is limited by a pin 28 projecting through the wall of the bushing 22 and operating in an axial groove 29 in the body. A central vertical opening 30 enters the body 23 from its lower end to receive the member 24 and this opening is of considerable length. The body 23 is proportioned so that its lower end is at or adjacent the lower face 31 of the upper frame arm when the cam lever 21 is fully actuated. This position of the body is shown in Figure 4.

The member 24 for carrying the rivet die or set is an elongate cylindrical part slidably received in the opening 30 of the body 23. The member extends downwardly beyond the lower end of the body 23, and is provided at its lower extremity with a replaceable rivet set 32, or its equivalent. If desired, the upper portion of the member 24 may be tubular. A transverse pin 33 is carried by the member 24 and operates in a vertical slot 34 in the body 33 to limit the downward travel of the member relative to the body, and a set screw 9 limits the upward travel of the member. A light coiled spring 35 is engaged between the upper end of the member 24 and the upper wall of the opening 30 to cushion the upward movement of the member when a new set 32 is being installed. The member 24 and its set 32 are vertically aligned with the anvil 11.

The means 25 is an important feature of the invention serving under normal operating conditions to positively transmit downward movement from the body 23 to the member 24, but disconnecting or freeing the member from the body in the event some object such as the operator's hand or finger, prematurely arrests downward travel of the member. In the form of the invention illustrated in Figures 1 to 5 inclusive, the means 25 comprises an annular series of steel balls 37 surrounding the member 24 and an annular groove 38 in the member for partially receiving the balls. The upper and lower walls of the groove 38 are flared or outwardly divergent, and the groove and balls are proportioned and related in such a way that the groove is capable of receiving only about one-half of each ball as shown in Figure 2.

The means 25 further includes a conical or downwardly and outwardly sloping face 39 on the lower end of the body, and a retainer 40 associated with the frame 10 to project inwardly at the lower end of the bushing 22. The face 39 is annular and provided to engage downwardly against the series of balls 37. The retainer 40 may be an annular or ring-like part arranged in spaced surrounding relation to the projecting portion of the member 24. Means are provided to guide the retainer 40 for limited vertical movement and to yieldingly resist downward travel of the retainer. Screws 41 are threaded in openings in the frame 10 and have their heads spaced below the face 31. Unthreaded portions of the screws 41 slidably pass through openings 42 in the retainer 40 to guide the retainer for vertical travel, and springs 43 are arranged under compression between the heads of the screws and the retainer. The springs normally hold the retainer upwardly against the face 31 and are compressible to allow the retainer to move downwardly to a position such as shown in Figure 4. When the springs 43 are in the compressed condition, their convolutions may engage one with the other to positively limit downward travel of the retainer. The parts are related and proportioned so that the balls 37 cannot become displaced from the assembly when the retainer 40 is in its lowermost position, the retainer and the member 24 serving to prevent such displacement.

In the operation of the device illustrated in Figures 1 to 5 inclusive, the spring 8 normally holds the body 23 in a raised position where its lower face 39 is some distance above the retainer 40 and the member 24 is also raised to occupy a position where its groove 38 is spaced above the retainer. The balls 37 rest on the retainer and are confined to the annular space between the interior of the bushing 22 and the external surface of the member 24. Thus prior to and at the beginning of the work cycle the parts in the positions just described, the lower face 39 of the body 23 being spaced a considerable distance above the retainer 40, the member 24 being raised so that the groove 38 is spaced above the retainer and the balls 37 being at rest on the retainer 40 where they are confined between the wall of the bushing 22 and the periphery of the member 24. Upon depressing the pedal 14, the valve 13 is reversed to operate the cylinder and piston mechanism 12, which in turn actuates the cam lever 21 to move the body 23 downwardly. During such downward movement of the body, the member 24 travels downwardly by gravity and when its groove 38 reaches a position such as shown in Figure 2, the balls 37 move into the groove. The pitched face 39 of the body 23 assists in moving the balls into the groove. The balls 37 are only partially received by the groove, and the face 39 remains in engagement with the balls. Thus the balls 37 are engaged between the face 39 and the walls of the groove 38, and serve to positively transmit downward movement from the body 23 to the member 24. Figure 2 illustrates the balls 37 in the force-transmitting position. As the body 23 continues downwardly, the member 24 is positively moved with the body and the retainer 40 likewise moves downwardly with the body, the balls being held between the face 39 and the walls of the groove 38 by the retainer. In practice, the actual working stroke of the member 24 occurs during the downward travel of the retainer 40. Figure 4 illustrates the parts in the fully actuated positions where the set 32 has driven or upset the rivet R against the anvil 11. Upon the return of the pedal 14 to its raised position, the cylinder mechanism 12 restores the block 18 and the spring 8 returns the body 23 to its raised position. The pin 33 and groove 34 cooperate to restore the member 24 to the raised position.

In the event that the operator's arm or hand is under the set 32 when the pedal 14 is depressed, the body 23 is positively moved downwardly as above described. The balls 37 simply rest on the retainer 40 at this time. The downward travel of the set-carrying member 24 is limited by the engagement of the set 32 with the workman's hand, and the member remains in a raised position or partially raised position. This prevents the groove 38 from assuming a position adjacent the retainer 40, the groove remaining in a position such as illustrated in Figure 3. Accordingly, the end face 39 of the body 23 moves downwardly past the groove 38 and ultimately engages the balls 37. However, at this time the balls 37 are confined between the wall of the bushing 22 and the plain surface of the member 24, and no downward force is transmitted from the balls to the member. The balls 37 are free to roll downwardly on the member 24 during the remainder of the stroke. Thus the power stroke of the body 23 is completed without the transmission of downward force to the member 24, and the only pressure applied to the workman's hand or finger results from the weight of the member 24 and the action of the light spring 35. This is insufficient to injure the operator. It will be observed that the safety device does not in any way interfere with the normal operation of the machine, but prevents injury to the operator if he depresses the pedal 14 at a time when his hand or arm is above the anvil 11.

The form of the invention illustrated in Figures 6 and 7 includes a body 45 operated by the cylinder mechanism 12, a set-carrying member 46 movable longitudinally relative to the body, and means 47 for transmitting movement from the body to the member, which means is rendered ineffective in the event that downward travel of the member 46 is prematurely resisted.

In this form of the invention the body 45 is a tubular part, screw-threaded to the lower end of a rod 48. The rod 48 is operated by the cam lever 21 and is returned by the spring 8 in the same manner as the body 23 described above. The body 45 is slidable in the bushing 22 and freely enters a cage 49 attached to the frame 10. I prefer to adjustably secure the cage 49 so that it may be shifted or adjusted vertically. In the structure illustrated, the cage 49 is adjustably screw-threaded into a nut 50 welded on the above described face 31.

The member 46 is an elongate stem-like part, and its upper portion is freely received in the body 45. The lower portion of the member 46 is reduced in diameter, and a suitable rivet set S, or the equivalent, is secured to its lower end. The reduced portion of the member 46 is slidably guided in an opening 51 in the lower wall of the cage 49.

The means 47 is an important feature of the invention and comprises a set of tongues or fingers 53 on the body 45 for cooperating with the member 46 under certain conditions to transmit movement and force from the body to the member. The body 45 has a series of circumferentially spaced axial slots 52 extending upwardly from its lower end and dividing its major lower portion into a series of prongs or fingers 53; see Figure 6. The fingers 53 are flexible and resilient, and cam means are provided to flex them inwardly upon downward movement of the body 45 in the cage 49. The outer sides of the fingers 53 have sloping or curved projections carrying anti-friction balls 54 set in recesses or pockets. The cage 49 is provided with an annular internal cam surface 64 which curves or slopes downwardly and inwardly with respect to the longitudinal axis of the assembly. The balls 54 ride along the internal surface of the cage 49 and are adapted to cooperate with the cam surface 64 to cause inward flexing of the fingers 53.

The set-carrying member 46 is provided with one or more shoulders for engaging with mating parts on the body 45. In the construction illustrated, the member 46 has two spaced annular flanges presenting downwardly and outwardly sloping surfaces 55. The interior of the body 45 has two spaced annular ridges presenting downwardly and outwardly sloping surfaces 56. As shown in Figure 7, these surfaces 56 are formed on the inner sides of the series of fingers 53. The surfaces 56 are spaced apart vertically the same distance as the surfaces 55 and have substantially the same inclination. The parts are related so that the surfaces 55 and 56 will clear or pass one another when the fingers 53 are in their normal or unflexed positions shown in Figure 7. However, when the fingers 53 are flexed inwardly by the cam surface 64, the surfaces 56 are brought into firm cooperation with the surfaces 55 for the transmission of downward movement from the body 45 to the member 46. A flange or lip 57 is formed on the upper end of the member 46 and is engageable with a seat 58 in the upper surface 56 to limit the downward travel of the member relative to the body 45 and to prevent displacement of the member from the assembly. A light coiled spring 59 may be engaged against the upper end of the member 46 to cushion relative movement between the body and member.

Figure 8 illustrates a slight modification of the device of Figures 6 and 7. In this construction the fingers 60 are separately formed parts secured to the body 45 by horizontal hinge pins 61. Springs 62 are associated with the fingers 60 to normally urge them outwardly so that the balls 54 remain in engagement with the internal surface of the cage 49. The surfaces 56 are formed on the inner sides of the fingers 60 for cooperation with the surfaces 55. All other parts of the device may be the same as described above, and the arrangement of Figure 8 operates in the same manner as the device of Figures 6 and 7.

In the operation of the safety device shown in Figures 6 and 7, the pedal 14 is depressed to actuate the mechanism 12, which in turn moves the body 45 downwardly toward the anvil 11. During this downward movement of the body 45 gravity causes the member 46 to move downwardly with the body. Thus the surfaces 55 remain in opposed and aligned relation to the surfaces 56 substantially as shown in Figure 7. When the body 45 approaches the lower end of its stroke, the balls 54 engage the cam face 64 and the fingers 53 are flexed inwardly. This brings the surfaces 56 into cooperation with the surfaces 55. The cam surface 64 is designed to move the fingers 53 inwardly an extent just sufficient to bring the surfaces 56 into engagement with the surfaces 55. When this has occurred, the balls 54 leave the cam surface 64 and continue downwardly along the cylindrical surfaces of the cage. The pitch or inclination of the engaging surfaces 55 and 56 assures the positive transmission of downward movement from the body 45 to the member 46. Thus the member 46 is positively actuated so that the set S may drive the rivet.

In the event that the operator's hand or other object is between the set S and the anvil 11 when the pedal 14 is depressed, the body 45 is actuated downwardly as above described. However, the set S moves into engagement with the object or hand and stops this downward travel. Accordingly, the surfaces 56 on the body 45 move downwardly past the stationary surfaces 55 of the member 46 and when the balls 54 co-operate with the cam surface 64 to flex the fingers inwardly, the surfaces 55 and 56 are out of register. The surfaces 56 are below their companion surfaces 55 and cannot engage them. Accordingly, the body 45 moves downwardly around the member 46 without transmitting movement. The only force applied to the operator's hand is the weight of the member 46 and he is saved from injury. The point at which the cam surface 64 actuates the fingers 53 may be adjusted or set by threading the cage 49 in the nut 50, and the cage may be secured or locked in the adjusted position by a nut 70.

Having described only typical forms of the invention, we do not wish to be limited to the specific details herein set forth, but wish to reserve to ourselves any variations or modifications that may appear to those skilled in the art and/or fall within the scope of the following claims.

We claim:

1. In a machine having a work part movable toward a work piece and power means for actuating the work part, the combination of a body movable toward the work piece by the power means and having a longitudinal opening, a member movable in the opening and extending therefrom, the extending portion of the member carrying said work part, the member being free to move the body when the same is actuated toward the work piece, the member having a groove and the body having a shoulder, the groove and shoulder being in substantially aligned relation so long as the member moves with the body, and balls adapted to engage with said groove and shoulder to transmit movement from the body to the member during a final portion of the movement but being incapable of engaging with the groove for the transmission of movement in the event an object interferes with said free movement of the member.

2. In a machine having a work part movable toward a work piece and power means for actuating the work part, the combination of a body movable toward the work piece by the power means and having a longitudinal opening, a member movable in the opening and extending therefrom, the extending portion of the member carrying said work part, the member being free to move with the body and being adapted to be stopped by an object between said work part and the work piece, the body having an end face, a series of balls, a yieldingly mounted retainer supporting the balls in position to be engaged by said face, and walls on the member defining a groove for partially receiving the balls for the transmission of movement from the body to the member when the groove moves to a position to partially receive balls when the same are supported by said retainer, said groove failing to come into the ball-receiving position in the event an object interferes with said free movement of the member.

3. In a machine having a work part movable toward a workpiece and power means for actuating the work part the combination of; a body movable toward the workpiece by the power means and having a longitudinal opening, a member movable in the opening and extending therefrom, the extending portion of the member carrying said work part, a shoulder on the body facing generally toward the workpiece, a shoulder on the member facing away from the workpiece, an annular series of balls engageable between said shoulders to transmit movement from the body to the member, and means supporting the balls at the shoulder of the body so that the balls engage between the two said shoulders to positively transmit movement from the body to the member in the event movement of the member toward the workpiece, and together with the body, is unresisted prior to the engagement of the work part with the workpiece.

DE LOY J. WHITE.
JAMES W. SMITH.

REFERENCES CITED

The following references are of record in the file of this patent:

UNITED STATES PATENTS

| Number | Name | Date |
|---|---|---|
| 999,850 | Palmer | Aug. 8, 1911 |
| 1,308,775 | Day | July 8, 1919 |
| 1,309,246 | Smith | July 8, 1919 |
| 1,684,296 | Brodsby | Sept. 11, 1928 |
| 1,869,895 | Hazenfield | Aug. 2, 1932 |
| 1,945,116 | Macfie | Jan. 30, 1934 |
| 2,259,257 | Mac Blane | Oct. 14, 1941 |
| 2,400,486 | Carlyle | May 21, 1946 |